(12) United States Patent
Shahani

(10) Patent No.: US 8,237,421 B1
(45) Date of Patent: Aug. 7, 2012

(54) DELIVERING OPTIMAL CHARGE BURSTS IN A VOLTAGE REGULATOR

(75) Inventor: Arvin R. Shahani, Menlo Park, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 147 days.

(21) Appl. No.: 11/818,285

(22) Filed: Jun. 14, 2007

(51) Int. Cl.
*G05F 1/00* (2006.01)
(52) U.S. Cl. ...................................................... 323/282
(58) Field of Classification Search .................. 323/224, 323/282, 284, 285
See application file for complete search history.

(56) References Cited

U.S. PATENT DOCUMENTS

| | | | | |
|---|---|---|---|---|
| 5,506,532 A * | 4/1996 | Milazzo | ........................ | 327/175 |
| 6,018,265 A * | 1/2000 | Keshtbod | ...................... | 327/540 |
| 6,243,278 B1 * | 6/2001 | Jacobs | .......................... | 363/127 |
| 6,724,174 B1 * | 4/2004 | Esteves et al. | ................. | 323/224 |
| 6,870,747 B2 * | 3/2005 | Bridge | ........................ | 363/21.06 |
| 6,882,236 B2 * | 4/2005 | Dinn et al. | ..................... | 331/138 |
| 6,933,706 B2 * | 8/2005 | Shih | ................................. | 323/222 |
| 7,049,774 B2 * | 5/2006 | Chin et al. | .................... | 318/438 |
| 7,091,706 B2 * | 8/2006 | Pierson | ......................... | 323/237 |
| 7,292,445 B2 * | 11/2007 | Linke | ............................. | 361/715 |
| 7,528,587 B2 * | 5/2009 | Wu et al. | ....................... | 323/282 |
| RE41,037 E * | 12/2009 | Esteves et al. | ................. | 323/224 |
| 2007/0075694 A1 * | 4/2007 | Xi et al. | ........................ | 323/282 |

* cited by examiner

*Primary Examiner* — Adolf Berhane
*Assistant Examiner* — Yemane Mehari
(74) *Attorney, Agent, or Firm* — Sidley Austin LLP

(57) ABSTRACT

In one embodiment, a method is provided for delivering optimal charge bursts in a voltage regulator under light load conditions. The method includes: in an initial period, determining an optimal turn-on time for a high-side switch of the voltage regulator to produce a desired voltage ripple; and in steady-state operation, turning on the high-side switch for approximately the optimal turn-on time, thereby delivering optimal charge bursts for the desired voltage ripple in the voltage regulator.

20 Claims, 5 Drawing Sheets

DELIVERING OPTIMAL CHARGE BURSTS IN A VOLTAGE REGULATOR

BACKGROUND

1. Field of Invention

The present invention relates power converters, and more particularly, to delivering optimal charge bursts in a voltage regulator.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy.

Some switching converters may use higher frequency for switching on and off the switching devices, which makes the current ripple in the inductor smaller. This allows the switching converter to be implemented with smaller filter components, including the output capacitor. But when a smaller capacitor is used, it must be refreshed more frequently, thus sacrificing efficiency in the switching converter.

One conventional technique to charge the output filter capacitor by a given voltage delta employs multiple, small charge bursts. This results in lower regulator efficiency because it increases dynamic power train losses—i.e., the switching devices in the regulator must each be turned on N times (instead of just once) to achieve a given voltage delta.

Another conventional technique to charge the output filter capacitor in a switching regulator employs a single charge burst. With this technique, however, the voltage delta at the end of the single charge burst varies. The variable voltage delta degrades regulator efficiency because power train dynamic losses are increased—i.e., the frequency of the charge bursts is higher than necessary as regulator parameters are varied.

SUMMARY

According to an embodiment of the present invention, a method is provided for delivering optimal charge bursts in a voltage regulator under light load conditions. The method includes the following: in an initial period, determining an optimal turn-on time for a high-side switch of the voltage regulator to produce a desired voltage ripple; and in steady-state operation, turning on the high-side switch for approximately the optimal turn-on time, thereby delivering optimal charge bursts for the desired voltage ripple in the voltage regulator.

According to another embodiment of the present invention, a system is provided for delivering optimal charge bursts in a voltage regulator under light load conditions. The system includes control logic circuitry for turning on a high-side switch of the voltage regulator. Determining circuitry determines an optimal turn-on time for the high-side switch of the voltage regulator to produce a desired voltage ripple. The determining circuitry provides at least one control signal to the control logic circuitry. In response to the at least one control signal, the control logic circuitry turns on the high-side switch for approximately the optimal turn-on time, thereby delivering optimal charge bursts for the desired voltage ripple in the voltage regulator.

According to yet another embodiment of the present invention, method is provided for delivering optimal charge bursts in a voltage regulator under light load conditions. The method includes the following: in an initial period, adjusting a control system for the voltage regulator over at least one cycle to provide an optimal turn-on time for a high-side switch of the voltage regulator to produce a desired voltage ripple; and in steady-state operation, turning on the high-side switch for approximately the optimal turn-on time over multiple cycles using the control system, thereby delivering optimal charge bursts for the desired voltage ripple in the voltage regulator Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 6 of the drawings. Like numerals are used for like and corresponding parts of the various drawings. Upon reading this disclosure, a skilled artisan can understand how to implement the present invention without undue experimentation.

In various embodiments, the present invention provides systems, circuitry, and methods for delivering optimal charge bursts for a given voltage ripple in a switching or voltage regulator. In some embodiments, a feedback loop is used for providing periodic charge bursts that yield a desired voltage ripple after each burst, independent of process and temperature variations, regulator input voltage, regulator output voltage, filter capacitor, filter inductor, load current, and comparator delays. In some embodiments, a comparator is used to compare the switching regulator's output voltage to a reference voltage at the end of the charge burst. The comparator may be a regular comparator or a strobed comparator.

Figure 6:
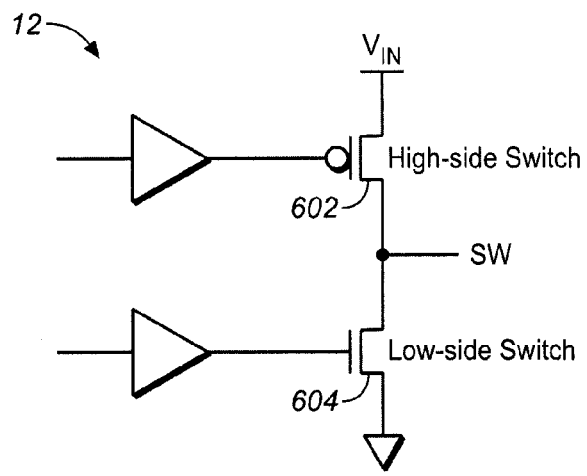
FIG. 6 is a schematic diagram of an exemplary implementation for a power train block.

With some embodiments, the switching or voltage regulator may be operated with variable frequency in light load conditions. The switching regulator may comprise a high-side switch and a low-side switch coupled in a half-bridge arrangement (as shown in FIG. 6). Embodiments of the present invention may cause the high-side switch to be turned on for varying periods, which in turn may also change the amount of time the low-side switch is turned on, to provide the optimal charge bursts for a given voltage ripple.

Figure 1:
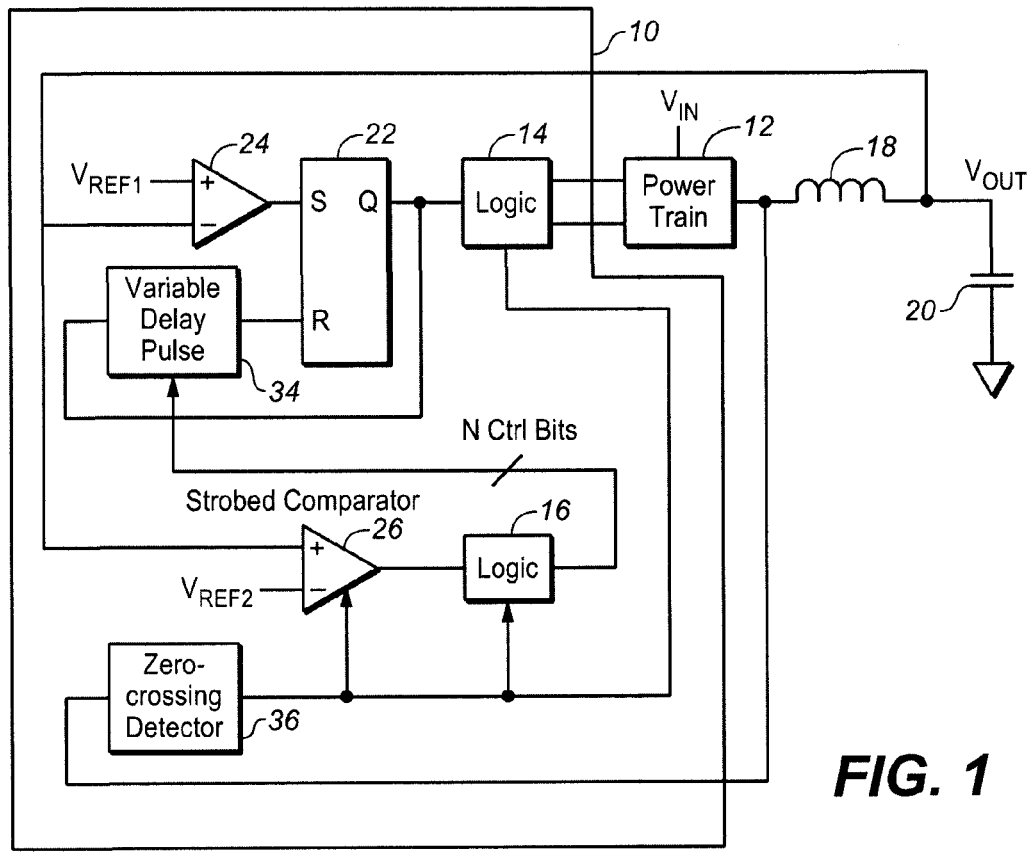
FIG. 1 is a schematic block diagram of an exemplary implementation for a system for delivering optimal charge bursts for a given voltage ripple in a voltage regulator, according to an embodiment of the invention.

FIG. 1 is a schematic block diagram of a system 10 for delivering optimal charge bursts for a given voltage ripple in a voltage regulator, according to an embodiment of the invention. In one embodiment, system 10 can be used with or incorporated into a switching regulator which can, for example, provide a direct current (DC) power. Such switching regulator, in turn, can be incorporated in or used with any electronic device in which a DC-to-DC converter is needed. In one embodiment, the switching regulator can be a current-mode, synchronous buck converter which converts a voltage at a higher level (e.g., 5V) to a voltage at a lower level (e.g., 1V). In other embodiments, power converter system 10 can be a boost or buck-boost converter.

The switching regulator receives an input voltage Vin and provides the DC power to a load at an output terminal Vout. As depicted in FIG. 1, the switching regulator may include a power train block 12, an inductor 18, and an output capacitor 20. The inductor 18 is coupled to the output capacitor 20 at the output terminal Vout of the switching regulator. As used herein, the terms "coupled" or "connected," or any variant thereof, covers any coupling or connection, either direct or indirect, between two or more elements. Current flows through inductor 18 for delivering power to the load at the output terminal and to charge and discharge output capacitor 20.

Power train block 12 is coupled to the inductor 18. In one embodiment, as shown in FIG. 6, power train block 12 may comprise a first switch 602 and second switch 604 connected in a half-bridge arrangement at a switching node (SW) and to inductor 18. Switch 602 can be the "high-side" switch and the switch 604 can be the "low-side" switch. The high-side switch 602 may be connected between the input voltage Vin and node SW, and when it is turned on the current of inductor 18 ramps up due to a positive voltage between node SW and the output. The low-side switch 604 may be connected between the node SW and ground (GND), and when it is turned on the current of inductor 18 ramps down due to a negative voltage between node SW and the output. The low-side switch 604 may be used to implement synchronous rectification or asynchronous rectification by emulating a diode. Each of the two switches 602, 604 in power train block 12 can be implemented with any suitable device, such as, for example, a metal-oxide-semiconductor field effect transistor (MOSFET), an IGBT, a MOS-gated thyristor, or other suitable power device. Each switch 602, 604 has a gate to which a respective driving voltage or control signal may be applied to turn the switch on or off.

Properly controlling the high-side and low-side switches 602, 604 yields a regulated output voltage for varying load currents. When system 10 is used to regulate the output voltage the following occurs during a cycle. The high-side switch 602 will turn on and the inductor current will ramp up from zero. At some time the instantaneous inductor current crosses above the load current and the voltage on the capacitor 20 starts to increase as charge is now stored on it. System 10 determines when the high-side switch 602 turns off and then turns on the low-side switch 604 to allow the inductor current to ramp down. At some point in time, the instantaneous inductor current crosses below the load current. This point is the peak of the voltage on the capacitor 20 and now the voltage on the capacitor 20 starts to decrease as it discharges. The low-side switch 604 is turned off when the zero-cross detector fires, and thus emulates a diode. The load current continues to discharge the capacitor 20 and when the output voltage falls below the Vref1 threshold system 10 turns on the high-side switch 602, and the cycle repeats.

The load on system 10 can vary during operation of the system. In general, the magnitude or condition of the load can be categorized as "heavy," "medium," or "light." The transition from a medium/heavy load to light load in the switching regulator occurs when the load current is roughly half the peak-to-peak inductor current ripple. The load current at which the transition takes place is a function of the input and output voltages. For example, if the value of inductor 18 is 1 uH and the switching frequency is 3 MHz, then the transition occurs at the following load currents: 143 mA (Vin=3.7V, Vout=1.35V), 90 mA (Vin=2.7V, Vout=0.75V), 105 mA (Vin=2.7V, Vout=1.7V), 108 mA (Vin=5.5V, Vout=0.75V), and 196 mA (Vin=5.5V, Vout=1.7V). The transition of the switching regulator from light load back to a medium/heavy load usually occurs at some multiple of the entry current. For example, if the multiple is 1.5, then the transition occurs at the following load currents: 214 mA (Vin=3.7V, Vout=1.35V), 135 mA (Vin=2.7V, Vout=0.75V), 157 mA (Vin=2.7V, Vout=1.7V), 162 mA (Vin=5.5V, Vout=0.75V), and 294 mA (Vin=5.5V, Vout=1.7V).

Under medium to heavy load conditions the switching regulator is controlled by elements (not shown) which may implement pulse width modulation (PWM) control. Pulse width modulation (PWM) is a technique which is commonly employed to vary the width of the pulse in a periodic signal for turning on and off the switching devices in the power train block 12. With PWM control, the frequency is held constant and the width of each pulse is varied to form a fixed-frequency, variable-duty cycle operation.

System 10 provides control of the switching regulator under light load conditions. System 10 operates to turn-on the high-side switch 602 in the power train block 12 for the appropriate amount of time to produce a desired DvOUT in a single charge burst. Normally, this can be challenging since the on-time (THS) for the high-side switch 602 that is needed to produce a desired DvOUT in a single charge burst is a function of variable parameters, such as, regulator input voltage, regulator output voltage, filter capacitor, filter inductor, load current, comparator delays, and process and temperature variations.

In general, system 10 delivers optimal charge bursts (for charging output capacitor 20) for a given voltage ripple in the regulator under light load conditions. Each such charge burst may be associated with a period of time (THS) during which the high-side switch 602 in power train block 12 is turned on. As shown, system 10 includes a control logic 14, delay adjustment logic 16, a latch circuit 22, comparators 24, 26, variable delay pulse block 34, and zero crossing detector block 36. When system 10 is combined with another controller for medium/heavy load conditions, certain blocks can be shared between the two control systems.

Control logic 14 can be coupled to power train block 12, and may generate the control signals for turning on and off the switches in power train block 12. Control logic 14 receives signals from latch circuit 22 and zero crossing detector block 36.

The latch circuit 22, as shown, can be implemented as a set-reset (SR) flip-flop. The set input of the latch circuit 22 receives the output from comparator 24, and the reset input receives the output from variable delay pulse block 34. Latch circuit 22 provides a signal (Q) to control logic 14. Under light load conditions, when latch circuit 22 is set, it will cause control logic 14 to turn on the high-side switch 602 in power train block 12, thus allowing current to increase through inductor 18 and charging the output capacitor 20. When latch circuit 22 is reset, it will cause control logic 14 to turn off the high-side switch 602 and turn on the low-side switch 604 in power train block 12. Turning on the low-side switch 604 allows current to decrease through inductor 18, but as long as the inductor current is greater than zero it still delivers charge to the output capacitor 20. When the inductor current reaches zero and the zero-crossing detector block 36 "fires" (as described below), the low-side switch 604 is turned off and the inductor stops delivering charge to the output capacitor 20. Setting of the latch circuit 22 thus initiates or defines the beginning of each charge burst delivered by system 10, whereas firing of the zero-crossing detector block 36 and turning off of the low-side switch 604 terminates or defines the end of each charge burst.

Comparator 24 can be part of a feedback loop for setting the latch circuit 22. As shown, comparator 24 can be coupled to receive a reference voltage Vref1 at one input terminal and to receive the output voltage Vout at another input terminal as a feedback signal. The comparator 24 compares the output voltage feedback signal to a voltage reference Vref1. When the value of the output voltage Vout falls below the voltage reference Vref1, then comparator 24 outputs a signal for setting the latch circuit 22, thus causing control logic 14 to turn on the high-side switch 602 in power train block 12 for each charge burst. Current ($i_{LF}$) flows through inductor 18 to charge the output capacitor 20.

Zero crossing detector block 36, comparator 26, delay adjustment logic 16, and variable delay block 34 can be part of a feedback loop for resetting the latch circuit 22. Variable delay pulse block 34 receives the output signal from the latch circuit 22, which notifies or informs variable delay pulse block 34 when the latch circuit 22 is set. After each set of the latch circuit 22, variable delay pulse waits for a variable delay time and then outputs a pulse signal to reset the latch circuit 22, thus causing control logic 14 to turn off the high-side switch 602 in power train block 12 for each charge burst. The length or duration of the variable delay is adjusted by a signal from the delay adjustment logic 16.

Zero crossing detector block 36 is coupled to the SW node and functions to detect when the current through inductor 18 is going to zero. Zero crossing detector block 36 "fires" or outputs a signal when the voltage at the SW node changes from negative to positive, indicating a zero current crossing.

Comparator 26 and delay adjustment logic 16 each receive the zero crossing signal from zero crossing detector block 36. Comparator 26 is coupled to receive a reference voltage Vref2 at one input terminal and to receive the output voltage Vout at another input terminal as a feedback signal. Comparator 26 outputs a signal for causing delay adjustment logic 16 to adjust the length of the charge burst (related to the on time of the high-side switch 602 in the power train block 12) during light load conditions. The comparator 26 can be a strobed comparator. The zero crossing signal strobes or causes the comparator 26 to compare the output voltage feedback signal to the voltage reference Vref2 at the end of each charge burst. If the value of the output voltage Vout is greater than Vref2 at the time of a zero crossing (or strobe signal from zero crossing detector 36), then the signal from comparator 26 causes the delay adjustment logic 16 to decrease the duration of the variable delay for variable delay pulse block 34, thereby reducing the on-time of the high-side switch 602 in the power train block 12. This results in a smaller charge burst. Conversely, if the value of the output voltage Vout is less than Vref2 at the time of a zero crossing, then the signal from comparator 26 causes the delay adjustment logic 16 to increase the duration of the variable delay for variable delay pulse block 34, thereby increasing the on-time of the high-side switch 602 in the power train block 12. This results in a larger charge burst. In steady-state, the on-time of the high-side switch 602 dithers around the optimal on-time.

In operation, system 10 provides control of the switching regulator or converter under light load conditions. System 10 causes power train block 12 to output an optimal charge burst for a given voltage ripple in the switching regulator, independent of regulator input voltage, regulator output voltage, filter capacitor, filter inductor, load current, comparator delays, etc. System 10 thus improves or provides better efficiency in a switching regulator.

In various embodiments, all or a portion of the switching regulator and system 10 shown in FIG. 1 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, inductor 18 and capacitor 20 are implemented as discrete components, and remaining elements or components can be provided on a single chip or die, or on one or more separate die.

FIGS. 2A through 2D are schematic diagrams of exemplary implementations for a variable delay pulse block 34, according to embodiments of the invention. As previously described, variable delay pulse block 34 provides a variable delay pulse signal which resets the latch circuit 22 after each set, thus defining the on time of the high-side switch 602 and, consequently, the amount of charge supplied through the inductor 18 to the output capacitor 20. Variable delay pulse block 34 receives one or more control signals from the delay adjustment logic block 16 to increase or decrease the duration or length of the variable delay.

Figure 2A:
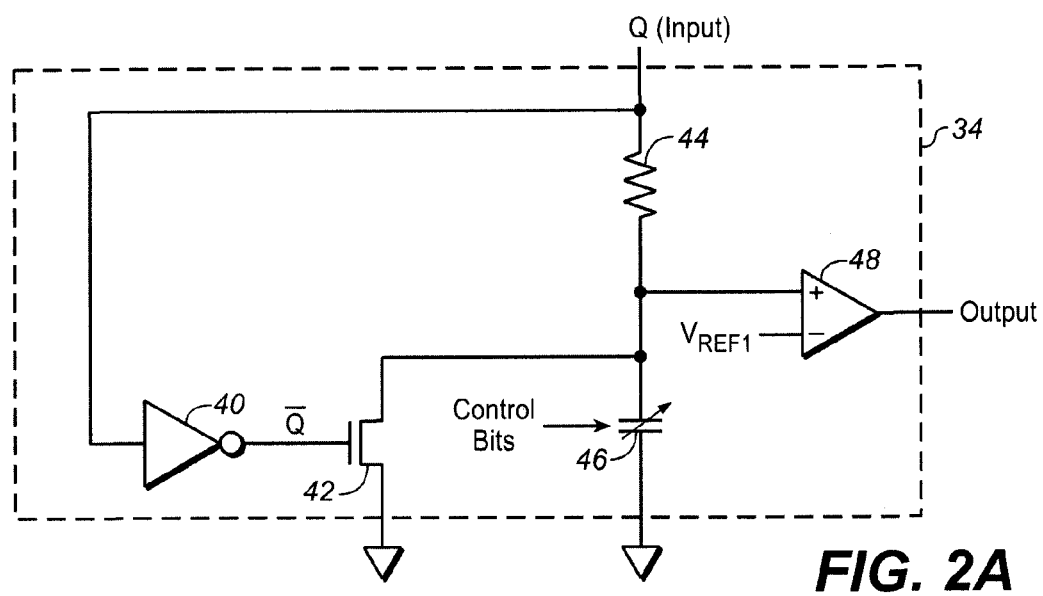
FIGS. 2A through 2D are schematic diagrams of exemplary implementations for a variable delay pulse block, according to embodiments of the invention.

Referring to FIG. 2A, in one implementation the variable delay pulse block 34 comprises an inverter gate 40, a switch 42, a resistor 44, an adjustable capacitor 46, and a comparator 48. Inverter gate 40 may be coupled to and receives the signal from the Q output of the latch circuit 22. Inverter gate 40 inverts the signal and provides an output to the control terminal of switch 42. Switch 42 controls the charging and discharging of capacitor 46. When switch 42 is turned off, capacitor 46 is charged by current flowing through resistor 44. Conversely, when switch 42 is turned on, capacitor 46 is discharged by current flowing through the switch. Comparator 48 compares the voltage on the capacitor 46 against the reference voltage Vref1.

The value of adjustable capacitor 46, and hence the RC time constant, is programmed by one or more control signals or bits from the delay adjustment logic block 16. The value of capacitor 46 is increased to delay the pulse at the output of variable delay pulse block 34, thereby providing for a longer charge burst. Conversely, the value of capacitor 46 is decreased to advance the pulse at the output of variable delay pulse block 34, thereby providing for a shorter charge burst.

Figure 2B:
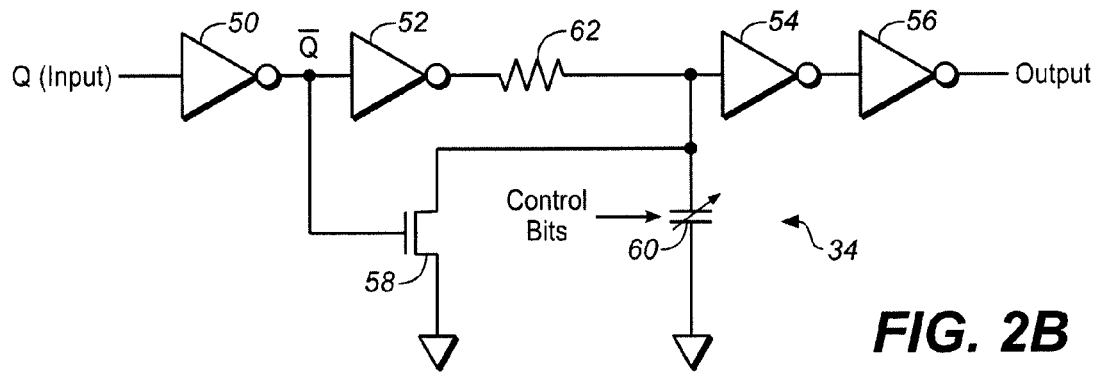

As shown in FIG. 2B, another implementation for the variable delay pulse block 34 comprises inverter gates 50, 52, 54, 56, a switch 58, an adjustable capacitor 60, and a resistor 62. Inverter gate 50 may be coupled to and receives the signal from the Q output of the latch circuit 22. Inverter gate 50 inverts the signal and provides an output to the control terminal of switch 58, which controls the charging and discharging of capacitor 60. When switch 58 is turned off, capacitor 60 is charged by current flowing through resistor 62. Conversely, when switch 58 is turned on, capacitor 60 is discharged by current flowing through the switch.

The value of adjustable capacitor 60, and hence the RC time constant, is programmed by one or more control signals or bits from the delay adjustment logic block 16. The value of capacitor 60 is increased to delay the pulse at the output of variable delay pulse block 34, thereby providing for a longer charge burst. Conversely, the value of capacitor 60 is decreased to advance the pulse at the output of variable delay pulse block 34, thereby providing for a shorter charge burst. In some embodiments, the implementation for variable delay pulse block 34 shown in FIG. 2B may require a larger range of capacitor values compared to the implementation shown in FIG. 2A.

Figure 2C:
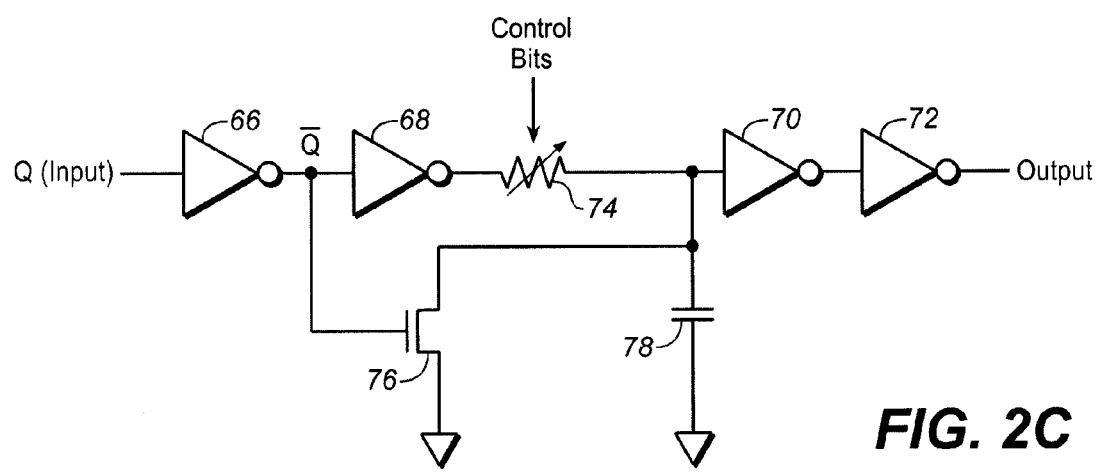

FIG. 2C shows an implementation for the variable delay pulse block 34 comprising inverter gates 66, 68, 70, 72, an adjustable resistor 74, a switch 76, and a capacitor 78. Inverter gate 66 may be coupled to and receives the signal from the Q output of the latch circuit 22. Inverter gate 66 inverts the signal and provides an output to the control terminal of switch 76, which controls the charging and discharging of capacitor 78. When switch 76 is turned off, capacitor 78 is charged by current flowing through adjustable resistor 74. Conversely, when switch 76 is turned on, capacitor 78 is discharged by current flowing through the switch.

The value of adjustable resistor 74, and hence the RC time constant, is programmed by one or more control signals or bits from the delay adjustment logic block 16. The value of resistor 74 is increased to delay the pulse at the output of variable delay pulse block 34, thereby providing for a longer charge burst. Conversely, the value of resistor 74 is decreased to advance the pulse at the output of variable delay pulse block 34, thereby providing for a shorter charge burst.

Figure 2D:
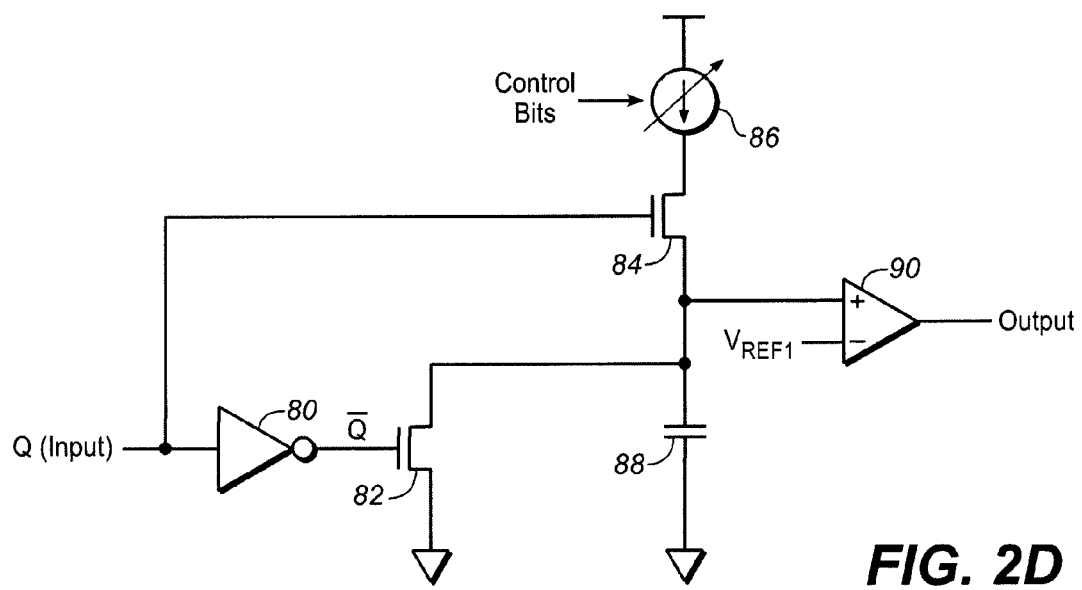

As shown in FIG. 2D, yet another implementation for the variable delay pulse block 34 comprises inverter gate 80, switches 82, 84, an adjustable current source 86, a capacitor 88, and a comparator 90. Inverter gate 80 may be coupled to and receives the signal from the Q output of the latch circuit 22. Inverter gate 80 inverts the signal and provides an output to the control terminal of switch 82. Switch 84 is controlled by the Q output of the latch circuit 22. Switches 82 and 84 control the charging and discharging of capacitor 88. When switch 82 is turned off and switch 84 is turned on, capacitor 88 is charged by current from adjustable current source 86. Conversely, when switch 82 is turned on and switch 84 is turned off, capacitor 88 is discharged by current flowing through switch 82.

The value of adjustable current source 86 is programmed by one or more control signals or bits from the delay adjustment logic block 16. The value of adjustable current source 86 is decreased to delay the pulse at the output of variable delay pulse block 34, thereby providing for a longer charge burst. Conversely, the value of adjustable current source 86 is increased to advance the pulse at the output of variable delay pulse block 34, thereby providing for a shorter charge burst.

Figure 3:
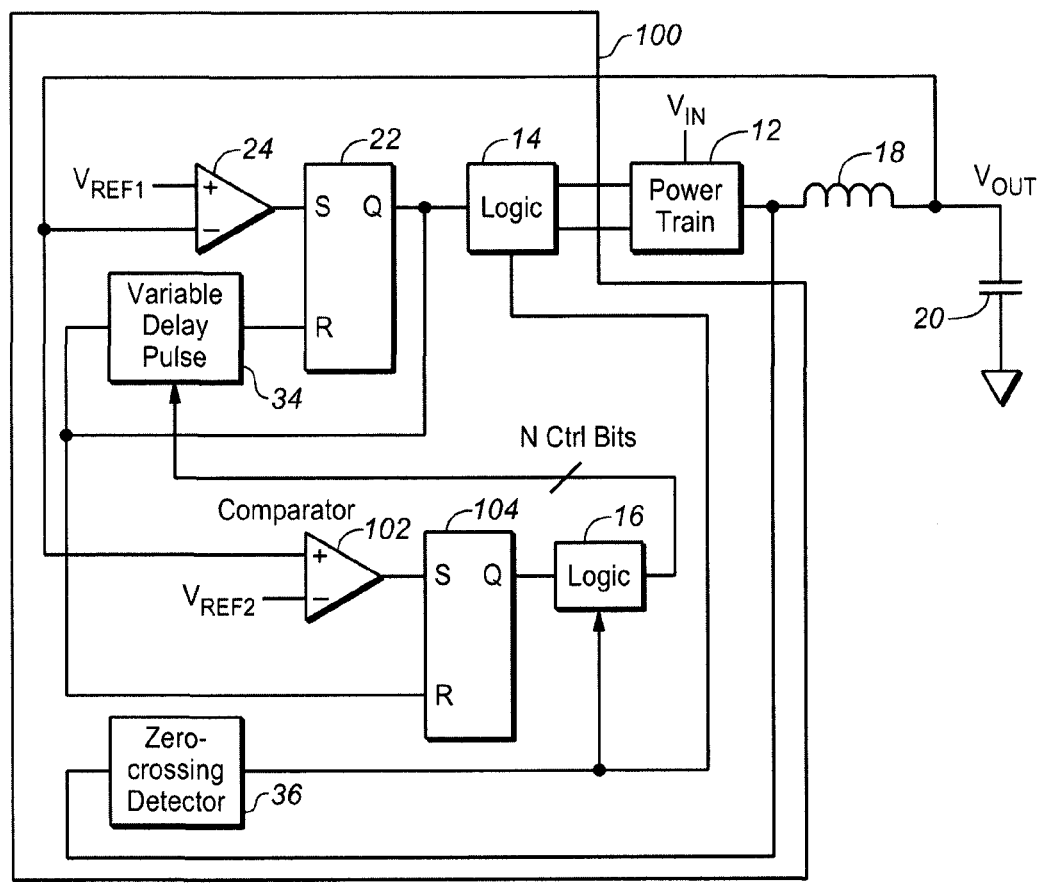
FIG. 3 is a schematic block diagram of another exemplary implementation for a system for delivering optimal charge bursts for a given voltage ripple in a voltage regulator, according to an embodiment of the invention.

FIG. 3 is a schematic block diagram of another exemplary implementation for a system 100 for delivering optimal charge bursts for a given voltage ripple in a voltage regulator, according to an embodiment of the invention. In one embodiment, system 100 can be used with or incorporated into a switching regulator which can, for example, include a power train block 12, an inductor 18, and an output capacitor 20.

System 100 shown in FIG. 3 is similar to system 10 shown in FIG. 1. Like system 10, system 100 provides control of the switching regulator under light load conditions. System 100 delivers optimal charge bursts (for charging output capacitor 20) for a given voltage ripple in the regulator. Each such charge burst may be associated with a period of time during which the high-side switch 602 in power train block 12 is turned on. As shown, system 100 includes a control logic 14, delay adjustment logic 16, comparator 24, a latch circuit 22, variable delay pulse block 34, and zero crossing detector block 36, which operate substantially as described with reference to FIG. 1.

Further, system 100 includes a comparator 102 and a latch circuit 104 instead of the strobed comparator 26 of system 10. Comparator 102 is coupled to receive a reference voltage Vref2 at one input terminal and to receive the output voltage Vout at another input terminal as a feedback signal. If the output of the comparator 102 is high at any time after the high-side switch 602 in power train block 12 has turned off while the low-side switch 604 is turned on, the latch circuit 104 is set. When the zero-crossing detector block 36 fires, the delay adjustment logic 16 decreases the duration of the variable delay, thereby reducing the on-time for the high-side switch 602 in the power train block 12. This results in a smaller charge burst. Conversely, if the output of the comparator 102 is low when the zero-crossing detector block 36 fires, the delay adjustment logic 16 increases the duration of the variable delay, thereby increasing the on-time of the high-side switch 602. This results in a larger charge burst. In steady-state, the on-time of the high-side switch 602 dithers around the optimal on-time.

Figure 4:
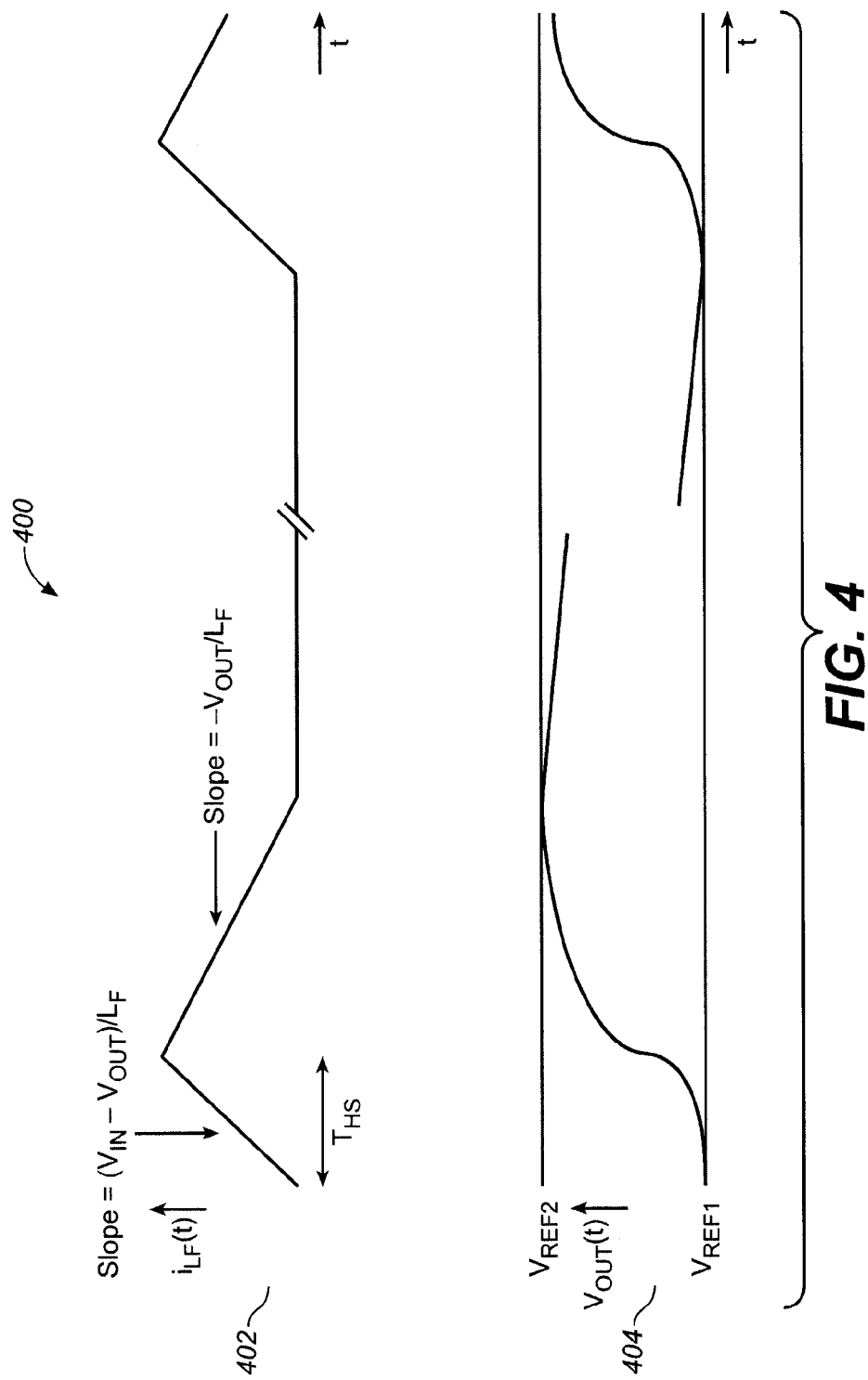
FIG. 4 is a waveform diagram illustrating exemplary waveforms in a voltage regulator.

FIG. 4 is a waveform diagram 400 illustrating exemplary waveforms in a voltage regulator, according to an embodiment of the invention. Diagram 400 includes waveforms 402 and 404 for the current $i_{LF}$ flowing through inductor 18 of the regulator and the Vout of the regulator under control of system 10.

With any switching regulator that has the variable parameters as inputs (e.g., regulator input voltage, regulator output voltage, filter capacitor, filter inductor, load current, and comparator delays) and is subject to process differences, it can be difficult to determine the right amount of turn-on time (THS) for the high-side switch 602 to produce a desired DvOUT in a single charge burst.

System 10 adjusts or controls the turn-on time (THS) to the appropriate amount so as to produce the desired DvOUT. This is accomplished using a feedback technique, which compares the Vout of the regulator against two voltage references: Vref1 (for comparator 24 in FIG. 1) and Vref2 (for comparator 26 in FIG. 1).

Diagram 400 shows that when the Vout reaches Vref1, system 10 turns on the high-side switch 602 of the power train block 12. When the high-side switch 602 is turned on, the current $i_{LF}$ flowing through inductor 18 increases. System 10 turns off the high-side switch 602 and turns on the low-side switch 604 when the variable delay pulse resets latch 22, which causes the current $i_{LF}$ to decrease. The inductor current charges the output capacitor 20 while the load current discharges the output capacitor 20. In general, if the instantaneous inductor current is greater than the load current, the output voltage increases; and if the load current is greater than the instantaneous inductor current, the output voltage decreases. The net charge delivered through the inductor 18 is greater than the net charge removed by the load, causing the Vout of the regulator to increase. The magnitude of Vout is given by the following equation:

$$Vout(t) = Vref1 + \frac{\int_0^t (iLF(t) - iLOAD(t))\,dt}{C_F}$$

where t=0 corresponds to the start of a cycle when the high-side switch 602 is turned on.

As shown in FIG. 4, system 10 is well-suited to use a bang-bang feedback loop with digital bits to control the turn-on time (THS) of the high-side switch 602.

In operation, over multiple cycles where the high-side switch 602 is turned on and off in light load conditions, system 10 initially adjusts and then causes the turn-on time (THS) to dither about the correct time, and hence the actual DvOUT dithers about the desired DvOUT. Thus, in a steady-state, system 10 delivers approximately the right amount of charge to the output capacitor 20 in a single burst. In other words, system 10 turns on high-side switch 602 once for a suitable duration to deliver approximately the right amount of charge to the output capacitor. This is more efficient than prior techniques.

Figure 5:
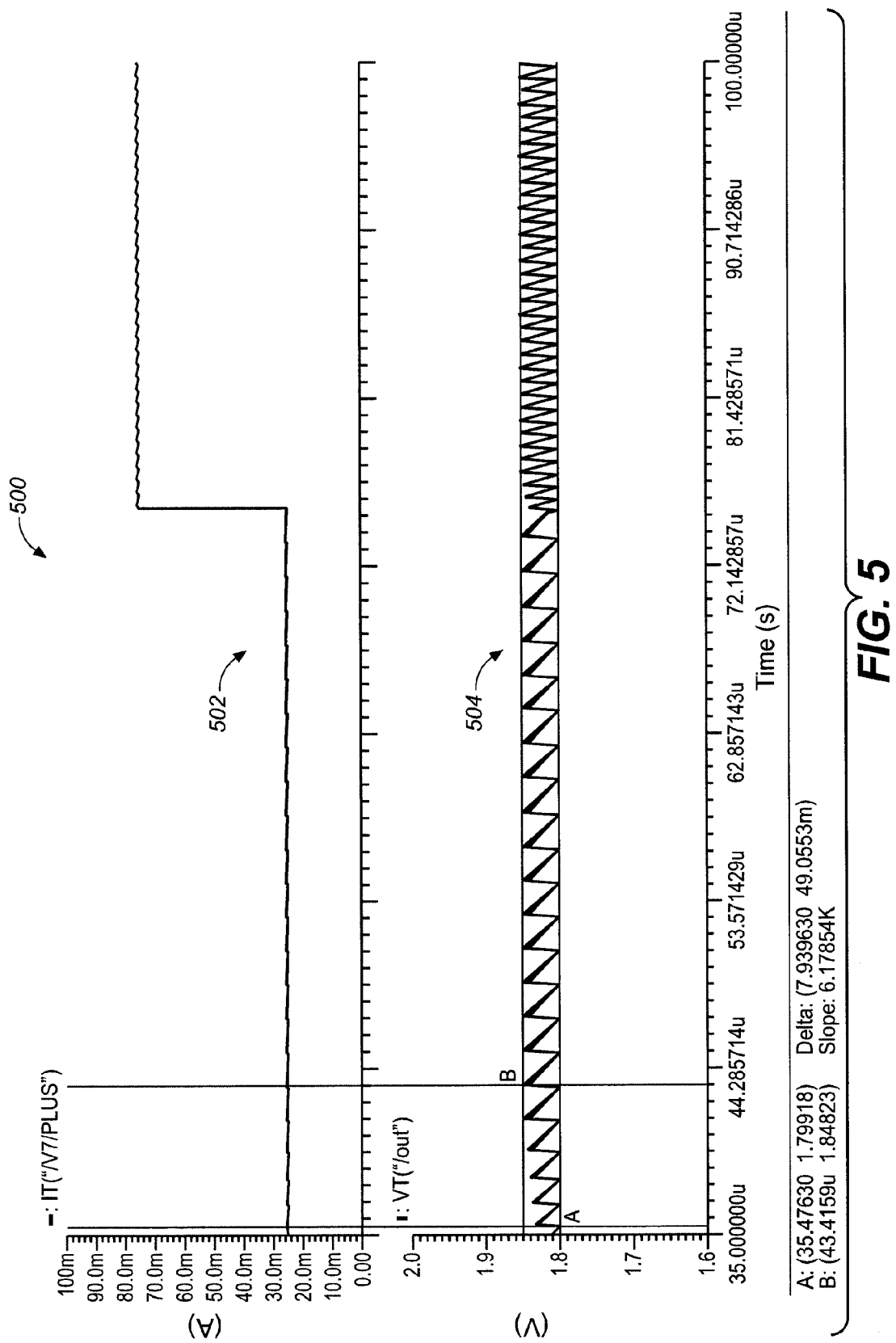
FIG. 5 is a waveform diagram illustrating exemplary waveforms in a system for delivering optimal charge bursts for a given voltage ripple in a voltage regulator, according to an embodiment of the invention.

FIG. 5 is a waveform diagram 500 illustrating exemplary waveforms in the system 10 for delivering optimal charge bursts for a given voltage ripple in a voltage regulator, according to an embodiment of the invention. Diagram 500 includes waveform 502 for the load current, and waveform 504 for the output voltage Vout of the regulator.

As shown, at the beginning, which can be immediately after some transition in current, the load current (waveform 502) may have one value (e.g., 25 mA). During a brief initial period, system 10 operates to adjust the charge bursts to produce the desired voltage ripple. This may be accomplished by zero crossing detector block 36, comparator 26, delay adjustment logic 16, and variable delay block 34 in system 10 working to adjust the delay for resetting the latch circuit 22, thereby increasing or decreasing the duration the high-side switch 602 is on in power train block 12.

A few cycles may be required for system 10 to reach the desired steady-state voltage ripple (waveform 504) for the regulator as the control loop increases or decreases the on-time of the high-side switch 602. Thus, after the brief initial period at the load current of 25 mA, the system 10 dials in or is set to deliver optimal charge bursts for a given voltage ripple in a switching or voltage regulator, independent of regulator input voltage, regulator output voltage, filter capacitor, filter inductor, load current, and comparator delays. In one embodiment, in steady-state, system 10 may dither about the two settings of the delay adjustment logic 16 which are closest to providing the desired voltage ripple in the switching regulator.

Next, at approximately 75 us in diagram 500, the load current (waveform 502) in the voltage regulator may change from the first value (e.g., 25 mA) to another value (e.g., 75 mA). When the load current is stepped to 75 mA, the control loop of system 10 once again operates to adjust the charge bursts (e.g., increasing or decreasing the on-time of the high-side switch 602) over a few cycles to reach the desired steady-state ripple. Since the load current increased, the setting for the lower load current yields less ripple voltage so the control loop increases the on time of the high-side switch 602, thus increasing the charge burst and hence voltage ripple. After a few cycles, system 10 reaches a new setting. After the brief initial period, system 10 may dither about two settings of the delay adjustment logic 16 in steady-state to deliver optimal charge bursts for a given voltage ripple in a switching voltage regulator.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A method for delivering optimal charge bursts in a voltage regulator under light load conditions, the method comprising:

in an initial period, determining an optimal turn-on time for a high-side switch of the voltage regulator to produce a single burst to yield a desired voltage ripple, wherein determining comprises detecting a zero crossing in power train circuitry of the voltage regulator and providing a signal indicative of the zero crossing; and in steady-state operation for the voltage regulator, periodically turning on the high-side switch for approximately the optimal turn-on time, thereby delivering optimal charge bursts that yield the desired voltage ripple after each single burst.

2. The method of claim 1, wherein turning on the high-side switch for approximately the optimal turn-on time comprises dithering between two settings for turn-on time of the high-side switch during steady-state operation.

3. The method of claim 1, wherein determining the optimal turn-on time occurs over at least one cycle of operation.

4. The method of claim 1, wherein turning on the high-side switch for approximately the optimal turn-on time occurs over multiple cycles of operation.

5. The method of claim 1, wherein determining the optimal turn-on time comprises adjusting a setting of a control system for the voltage regulator, wherein the control system is used for turning on the high-side switch.

6. The method of claim 5, wherein the control system dithers between two settings for turn-on time of the high-side switch during steady-state operation.

7. The method of claim 5, wherein adjusting comprises providing a feedback of an output voltage of the voltage regulator to the control system during the initial period.

8. The method of claim 1, wherein optimal charge bursts are delivered to yield the desired voltage ripple in the voltage regulator despite variations in regulator input voltage, regulator output voltage, filter capacitor, filter inductor, and load current.

9. The method of claim 1, wherein optimal charge bursts are delivered to yield the desired voltage ripple in the voltage regulator despite process variations in manufacturing one or more components of the voltage regulator.

10. A system for delivering optimal charge bursts in a voltage regulator under light load conditions, the system comprising:

control logic circuitry for turning on a high-side switch of the voltage regulator; and determining circuitry for determining an optimal turn-on time for the high-side switch of the voltage regulator to produce a single burst to yield a desired voltage ripple, the determining circuitry providing at least one control signal to the control logic circuitry;

wherein the determining circuitry comprises zero-crossing detector circuitry for detecting a zero crossing in power train circuitry of the voltage regulator, the zero-crossing detector circuitry providing a signal indicative of the zero crossing;

wherein in response to the at least one control signal the control logic circuitry periodically turns on the high-side switch for approximately the optimal turn-on time, thereby delivering optimal charge bursts that yield the desired voltage ripple after each single burst.

11. The system of claim 10, wherein the at least one control signal adjusts a setting of the control logic circuitry.

12. The system of claim 11, wherein the determining circuitry dithers between two settings for turn-on time of the high-side switch during steady-state operation.

13. The system of claim 10, wherein the determining circuitry comprises a feedback loop for providing a feedback signal indicative of an output voltage of the voltage regulator.

14. The system of claim 10, wherein the determining circuitry comprises variable delay pulse circuitry for providing a signal to variably delay the turn-on time of the high-side switch.

15. The system of claim 10, wherein optimal charge bursts are delivered to yield the desired voltage ripple in the voltage regulator despite variations in regulator input voltage, regulator output voltage, filter capacitor, filter inductor, and load current.

16. The system of claim 10, wherein optimal charge bursts are delivered to yield the desired voltage ripple in the voltage regulator despite process variations in manufacturing one or more components of the voltage regulator.

17. A method for delivering optimal charge bursts in a voltage regulator under light load conditions, the method comprising:

in an initial period, adjusting a control system for the voltage regulator over at least one cycle to provide an optimal turn-on time for a high-side switch of the voltage regulator to produce a single burst to yield a desired voltage ripple; and in steady-state operation for the voltage regulator, turning on the high-side switch for approximately the optimal turn-on time over multiple cycles using the control system, thereby delivering optimal charge bursts that yield the desired voltage ripple after each single burst;

wherein turning on the high-side switch for approximately the optimal turn-on time comprises dithering between two settings for the control system during steady-state operation.

18. The method of claim 17, wherein adjusting comprises providing a feedback of an output voltage of the voltage regulator to the control system during the initial period.

19. The method of claim 17, wherein optimal charge bursts are delivered to yield the desired voltage ripple in the voltage regulator despite variations in regulator input voltage, regulator output voltage, filter capacitor, filter inductor, and load current.

20. The method of claim 17, wherein optimal charge bursts are delivered to yield the desired voltage ripple in the voltage regulator despite process variations in manufacturing one or more components of the voltage regulator.

* * * * *